D. C. MULVIHILL.
AUTOMOBILE LIFTING JACK.
APPLICATION FILED AUG. 1, 1917.
1,245,160.
Patented Nov. 6, 1917.
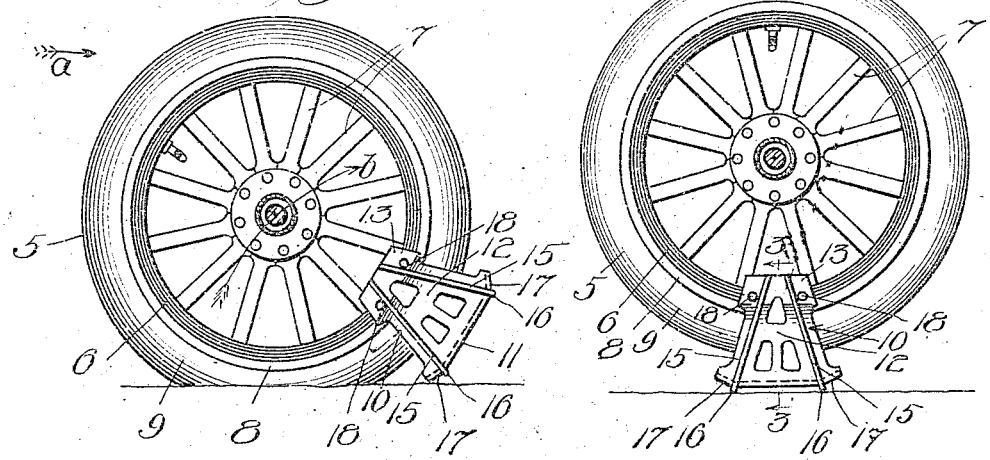
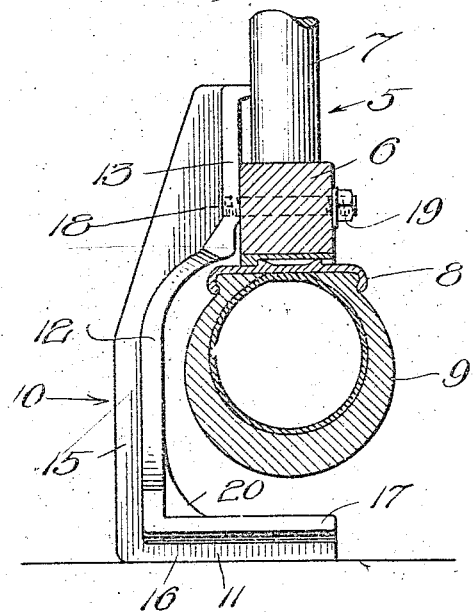
Witness:
Harry S. Gaither
Inventor:
Daniel C. Mulvihill
by Charles O. Shervey
Atty

UNITED STATES PATENT OFFICE.

DANIEL C. MULVIHILL, OF HANNIBAL, MISSOURI.

AUTOMOBILE LIFTING-JACK.

1,245,160.         Specification of Letters Patent.         Patented Nov. 6, 1917.

Application filed August 1, 1917. Serial No. 183,967.

*To all whom it may concern:*

Be it known that I, DANIEL C. MULVIHILL, a citizen of the United States, and a resident of Hannibal, county of Marion, and State of Missouri, have invented certain new and useful Improvements in Automobile Lifting-Jacks, of which the following is declared to be a full, clear, and exact description.

This invention relates to automobile lifting devices, and its primary object is to provide a simple, efficient and inexpensive device of this character, which may be readily and quickly applied to a wheel of an automobile, and the wheel raised without much effort on the part of the user. With the ordinary hand power lifting jack, considerable labor is required to lift an automobile wheel free from the ground and unless the brakes are set tight, there is danger of the vehicle moving slightly after the wheel has been raised, and this may cause serious damage in case the tire has been removed and the vehicle moves sufficiently to tilt the jack over. With the present invention, the manual labor of lifting the wheel is dispensed with, and all that is necessary for the user to do is to attach the device to the wheel and move the vehicle a few inches which may be done by driving the vehicle forward or backward through such distance.

The invention consists therefore in a new article of manufacture capable of being readily attached to a wheel and having a base portion spaced below the tire, and capable of raising the wheel when the latter is rotated. It further consists with several novel features hereinafter fully set forth and claimed.

The invention is clearly illustrated in the accompanying drawing, in which:

Figure 1, is a side elevation of an ordinary automobile wheel with a simple embodiment of my present invention applied thereto, showing its position before the wheel is raised; Fig. 2, is a view similar to Fig. 1, with the wheel raised; and Fig. 3, is a vertical section taken on line 3—3 of Fig. 2, but showing the lifting device in end elevation.

Referring to said drawing, the reference numeral 5, designates an automobile wheel of ordinary and well known construction having the usual felly 6, and spokes 7. On the felly is secured a rim 8, to which is secured a pneumatic tire 9.

The lifting device is seen at 10, and may be constructed of steel, iron, brass, aluminum or other desirable metal, and may be forged or cast as desired. Said lifting device has a comparatively wide base 11, preferably of rectangular formation, from which rises a standard or upright member 12. The base 11, is adapted to underlie the tire of a wheel when in use and the upright member 12, to stand along the side of the tire adjacent the body of the vehicle. The upper end portion 13, of the upright member 12, is offset with respect to the lower portion, and is adapted to be placed against the felly of the wheel and secured thereto. The extreme upper end may have a flange 14, extending laterally away from the offset portion 13, and adapted to bear against spokes of the wheel.

Strengthening ribs 15, are formed upon one face of the upright member, and said ribs are continued under the base 11, as at 16. Said ribs 15, extend in lines approximately radial with respect to a wheel to which it is applied, and the end portions 17, of the base 11, curve up slightly to facilitate the operation of the device.

Secured to and projecting from the offset end portion 13, in the same direction as the base, are bolts or screw threaded pins 18, which are provided with nuts 19, upon their outer threaded ends. Said screw threaded pins may be secured to the offset end portion 13, by forming holes in said end portion, tapping the holes and screwing the pins into them.

In the fellies of automobile wheels, to which this lifter is applied, holes are drilled on the side opposite the tire valve, said holes being drilled from one face of the felly to the other face. The holes are spaced apart to receive the screw threaded pins 18. The upright member may be formed with openings to lighten the same, and may be formed with additional reinforcing ribs 20.

In use, the threaded pins 18, of the lifting device are thrust through the transverse holes of the felly from the inner side thereof, and the nuts 19, screwed up tight on said pins. If desired, washers may be interposed between the nuts and felly. It is to be understood that the wheel should occupy a position where the holes therein are considerably above the ground. In Fig. 1, such a position is seen with the lifting device applied to the felly. Thereafter the vehicle is moved in the direction of the arrow a, in Fig. 1, the upwardly curved end portion 17, of the base 11, first striking the ground, which acts as a fulcrum around which the wheel is swung in the direction of the arrow b, until the axle of the wheel reaches a vertical line running through the center of the lifting device, whereupon the wheel will be held in a raised position by the device. If it is used on soft ground, the ribs 16, sink into the ground, and if it is used on hard pavement, the ribs 16, support the structure. The tire may now be removed from the felly in the usual manner. To detach the device from the wheel, the vehicle is moved forward or backward until the device is free of the ground, the nuts are then unscrewed and the device removed by withdrawing the screw threaded pins from the holes in the felly.

I claim as new, and desire to secure by Letters Patent:

A lifting device for automobiles, comprising an upright member formed with a base at the bottom, and an offset portion at the upper end, adapted to bear against the side of the felly of a wheel, strengthening ribs on one side of the upright member, and under the base, the ribs on the bottom of the base extend transversely thereof, the end portions of said base being inclined upwardly, and means for detachably securing said upright portion to a wheel, substantially as and for the purpose set forth.

DANIEL C. MULVIHILL.